July 22, 1969  C. T. CONROY  3,457,007

DIFFERENTIAL PRESSURE GATE

Filed Sept. 10, 1965

INVENTORS
COLEMAN T. CONROY

BY

*Sandoe, Neill, Schottler & Wikstrom*

ATTORNEYS

United States Patent Office 3,457,007
Patented July 22, 1969

3,457,007
DIFFERENTIAL PRESSURE GATE
Coleman T. Conroy, Malibu, Calif., assignor to Cinerama, Inc., New York, N.Y., a corporation of New York
Filed Sept. 10, 1965, Ser. No. 486,477
Int. Cl. G03b 1/52, 21/14, 21/40
U.S. Cl. 352—222        1 Claim This invention relates to motion picture projectors and, more particularly, relates to an improved method and apparatus for reducing flutter of the projected frame during projection of an image therefrom.

In the projection of motion pictures, the film is advanced intermittently, one frame length at a time through a film gate. As each successive film frame reaches the film gate, it is stopped and brought into register for projection of an image therefrom. A shutter is opened to permit light from a high intensity source to pass through the frame to project the image through the projection lens onto a screen. In conventional practice, the shutter is opened twice for each frame stoppage to reduce flicker effect.

High intensity light sources, such as electric arc sources, are commonly used in the projection of motion pictures for commercial purposes. As the shutter opens, the film frame is subjected to the impingement of high energy levels as the light is projected upon the frame and portions of the impinging energy are absorbed by the film. Since the film can be considered a two-layer composite of an emulsion formed on a base, the impacting of the high light energy thereupon causes the film to buckle much in the same manner as a bimetallic element. Although the films are conventionally held at both edges, the buckling extends through the center of the frame, causing displacement of portions of the frame from the desired image plan.

With lenses of long focal length, the excursion of the film does not move the film beyond the circle of confusion and acceptable resolution (in the subjective sense of viewer comfort) is obtained. However, with many modern systems, the film size has been increased and the focal length of the lens decreased. Concomitantly, image magnification has usually increased. Thus, the depth of focus has been shortened and the film excursion during the projection cycle has gone beyond that tolerable by the lens, degrading the resolution of the projected image beyond that found acceptable by the viewer.

Various systems have been proposed for the elimination of this flutter. For example, various methods have been proposed for directing jets of air upon the film while held in the projection gate in order to counteract the tendency to buckle. In general, none of the systems operate to reduce the flutter. Some of the systems use the air jets as a proposed method for cooling of the film. However, the high intensity of energy absorbed from the arc lamps cannot be dissipated by air blasts across the surface of the film over the short exposure interval.

Pressure plates of glass bearing on the film have been proposed. However, the glass gets dirty, as by oil and wax from the film and, since the glass plate must be mounted at the focal plane of the projector, the dirt smears are imaged on the screen.

Liquid gates have been utilized in which the film is run through a gate having transparent end walls. The gate is so constructed as to permit flooding of the gate between each side of the film and the respective end wall with a hydrocarbon liquid. After the film leaves the gate, the liquid is blown off the film into a receiving trap by air jets. The liquid gate operates to reduce flutter and is utilized in film processing laboratories. However, for use in projector booths of commercial theaters, the liquid gate has distinct drawbacks. First, such gates are very expensive. Secondly, the fumes from the hydrocarbon blown off the film fills the booths, creating projectionist's discomfort. In many areas, the use of such gates is barred by health regulations.

It is, therefore, an object of the present invention to provide an improved method and apparatus for reducing the excursion of a film frame during transmission of the intense light therethrough for projection of the image thereof.

In accordance with this object, there is provided, in a preferred embodiment of this invention, a projector having a light source and a shutter mechanism positioned in front of said source to regulate the transmission of light therefrom. A film gate is provided to position each frame of the film in registry with the light transmitted through the shutter and to hold the film stationary during projection of such frame. A plenum chamber is positioned adjacent said film gate to apply to one side of said film a pressure which differs from atmospheric pressure and which is applied substantially uniformly over the entire frame. The differential pressure gate reduces the excursion of the film. The projector is completed by a projection lens to project the frame image upon the desired screen.

The plenum chamber must be so constructed as to permit transmission of light therethrough and, thus, may utilize as a wall a glass plate. The glass plate may be in addition to the normal elements contained in a projector or my utilize elements already in the projector such as the rear lens elements of the projection lens or the heat filter element positioned between the shutter and the gate.

Having briefly described this invention, it will be described in greater detail along with other objects and advantages thereof in the following portions of the specification, which may best be understood by reference to the accompanying figures, of which:

Figure 1:
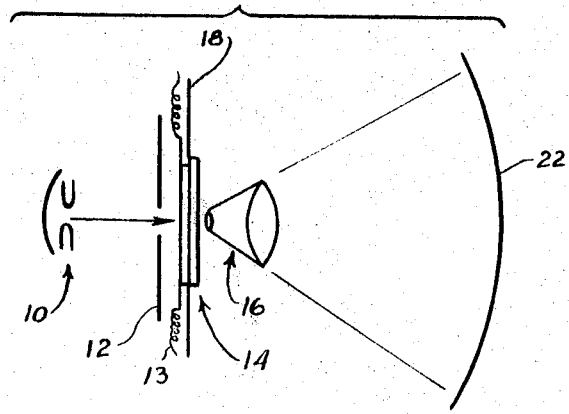
FIG. 1 is a elevation view in schematic form of a projector incorporating the present invention.

In FIG. 1, there is shown a typical projector incorporating the differential pressure gate 14 in accordance with the instant invention which comprises a source of high intensity light 10 which may, as illustrated, be an electric arc struck between electrodes, a shutter 12, the gate 14 and a projector lens 16.

The gate operates to bring one frame of the film 18 into proper registry with the optical axis of the projector and to hold the frame stationary, during which time the shutter 12 opens to permit light to pass therethrough and to project the image on the frame through the lens 16 on the screen 22. In order to reduce the flicker effect, the shutter normally operates to permit two bursts of light to pass through the frame. Thus, for example, if the projector is operating at 24 frames per second, the shutter will operate at 48 cycles per second synchronized with stabilization of the frame in the gate.

The transport mechanisms for advancing the film frame is conventional, usually incorporating sprocket drives engaging the sprocket holes on each side of the film. The transport mechanism is not illustrated since this is conventional and would obscure the details of the instant invention.

Figure 3:
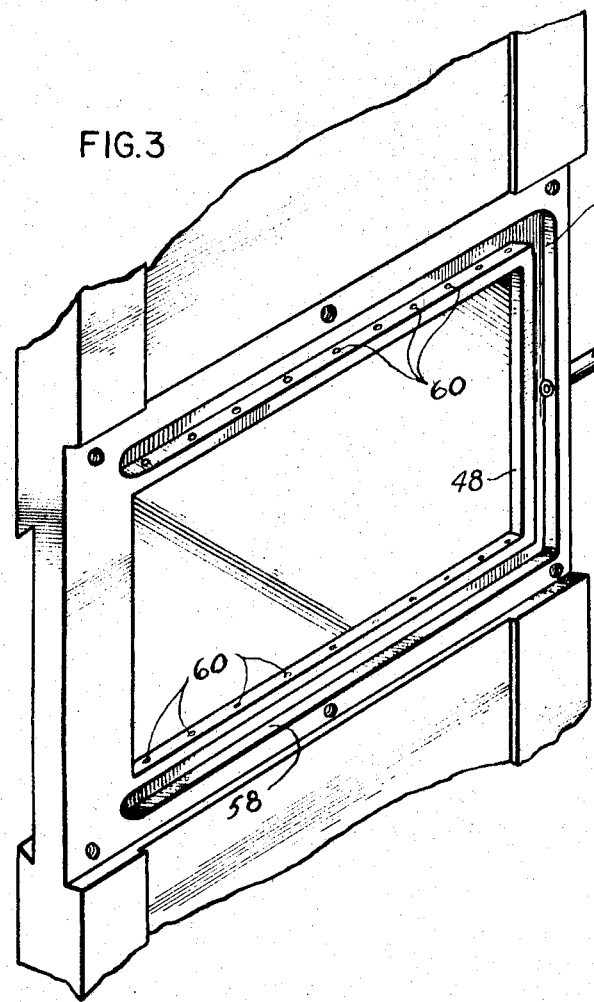
FIG. 3 is a perspective view of the plenum chamber of FIG. 2 with the front plates removed to show the air distributing ducts in the plenum chamber.
Figure 2:
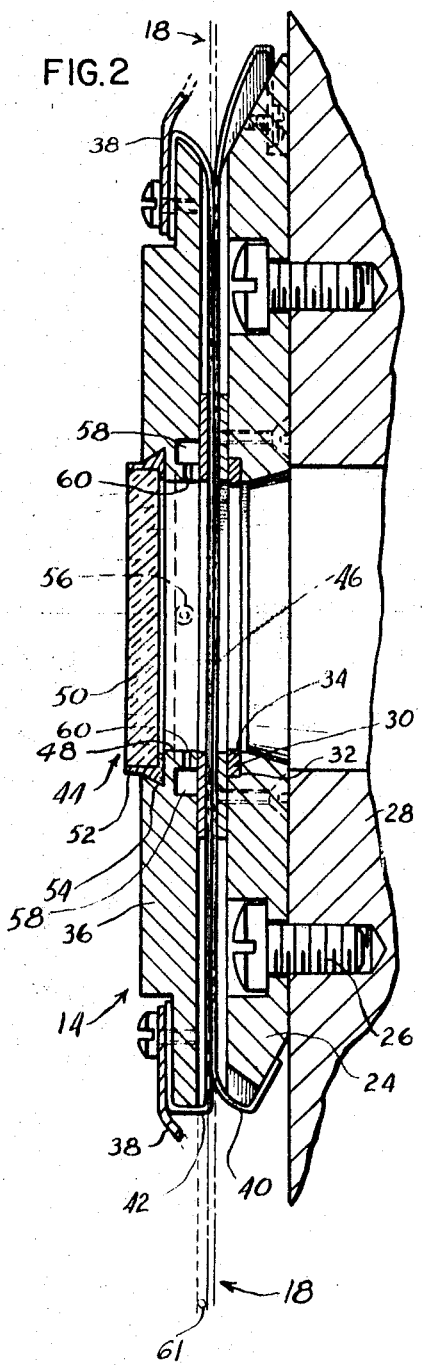
FIG. 2 is a sectioned view through the gate of FIG. 1.

Reference will now be made to FIGS. 2 and 3 which illustrate the gate in greater detail.

The differential pressure gate 14 is formed by a front plate 24 secured by screws 26 to the pressure pad 28 of the projector. The front plate is provided with a frame aperture. The frame transmission aperture is usually defined by a removably inserted mask plate 30 which is slidably inserted in ways 32 and which is provided with the aperture defined by the inner periphery 34 suitable for the frame dimension and screen configuration used.

A back plate 36 is resiliently mounted against the front plate 24. The resilient mounting is provided by mounting straps 38, one end of which is secured to the back plate by screws 40 and the other end of which is coupled to the projector frame through biasing springs (not shown in FIG. 2, but illustrated schematically as 13, FIG. 1).

The purpose of the resilient mounting is to hold the plates together to define a passageway for the film but to permit small movements of the back plate to permit splices to pass through the gate.

It is convenient to machine the mating faces of the front and back plates for substantial matching and to provide separation therebetween for passage of film 18 by applying shim straps 40, 42 on front and back plate marginal portions respectively. The shim straps run the length of the film and along each side thereof to provide a slot therebetween for film passage.

The rear plate is provided with a plenum chamber 44 to apply a substantially uniform pressure to the from 46 held stationary in the gate.

The plenum chamber is defined by the walls 48 of the aperture through the rear plate and by the glass wall 50. The glass wall 50 permits the passage of light therethrough and may, for convenience, be mounted in a removable holder 52 to enable easy cleaning thereof. The holder 52 slides in dovetail slots 54 in the rear plate. The glass wall 50 may serve the sole function of defining the plenum chamber. Alternatively, in some projectors, functional combinations may be made. For example, the wall 50 might be the heat filter element normally inserted between the shutter and the gate. Also, by placing the plenum chamber on the front plate, the wall 50 may be the rear optical element of the projector lens.

Air pressure is introduced into the plenum chamber 44 through an entrance aperture 56. The air introduced is distributed by channels 58 to a plurality of peripheral ducts 60. The ducts distribute the air to provide substantially uniform pressure throughout the chamber. It has been found that if the gap 61 between the plenum chamber and the film is very small, that approximately 5 p.s.i. of air will be sufficient to stabilize the flutter. If the leakage from the plenum chamber is very low, the pressure must be carefully controlled to avoid buckling of the film towards the lens, thereby to displace the film from its focal plane by an unacceptable amount. For commercial operation, however, it is usually desirable that the critical control over pressure be avoided. It is then found that providing leakage paths of greater magnitude will permit the use of higher pressure air but will also result in the ability to use pressures which vary more widely from the desired without unduly influencing the flutter reduction of the plenum chamber. Thus, for example, with sufficiently open leakage paths, air pressure of 40 p.s.i. may be introduced and a variation from this pressure of ±50% tolerated.

For the purpose of illustration, it might be advantageous to give an illustration of a typical application of this type of differential pressure chamber. In one installation, 70 mm. film perforated on each side was employed. The aperture size was 1.913 x 0.868 in. The focal length of the lens was 2½ in. projecting on the screen 70 feet across. The permissible excursion of the film from the film plane under these conditions is approximately ±four-thousandths of an inch. Without the differential pressure, the excursion during the pulsations applied when the shutter is opened ranged to eight-thousandths of an inch and the image was degraded beyond that considered satisfactory for viewing. However, with the plenum chamber energized, the excursion was limited in the one direction and the film could be maintained at the film plane with less than ±four-thousandths of an inch excursion permitting acceptable projection.

The differential pressure applied to the frame limits the excursion in the one direction and stabilizes the film. Thus, it will also be noticed by those skilled in the art that the differential pressure can be applied by drawing a vacuum from the plenum chamber utilizing the atmospheric pressure on the opposite side of the frame. In either case, the differential pressure can be maintained at the desired level to effect the film frame stabilization.

This invention may be variously modified and embodied within the scope of the subjoined claim.

What is claimed is:

1. A differential pressure gate for use with a motion picture projector having a high intensity light source, a gate having front and back plates, each of said front and back plates having an aperture therein, said plates being positioned with said apertures in alignment, transport means associated with said gate for advancing a frame of a film into said gate and holding said frame stationary therein when aligned with said apertures for the short time of frame projection and then advancing the next frame into said gate, a shutter to controllably permit light to pass from said high intensity source through said apertures and through the frame aligned with said apertures, and a projection lens to project the image on said frame, said differential pressure gate comprising a plenum chamber positioned adjacent one of said plates, said plenum chamber comprising a walled chamber communicating with the aperture in said one of said plates, said plenum chamber having at least one transparent wall portion to permit passage of said controlled light through said plenum chamber, and means coupled to said plenum chamber to generate a substantially uniform gaseous pressure therein, said pressure generating means comprising a channel extending around at least a portion of the periphery of said plenum chamber and which includes a plurality of ducts extending from said channel and into said plenum chamber, said ducts being substantially parallel with said frame held within said gate to prevent nonuniform distribution of pressure on said frame as gas under pressure is introduced through said channel and said ducts into said chamber, which pressure is maintained by the walls of the plenum chamber and the frame of said film held within said gate, and is thus applied substantially uniformly across the entire surface of one face of the frame of the film held within said gate, said gaseous pressure being different from the ambient pressure applied to the otherwise unsupported opposite face of said frame through the aperture in the other of said plates.

References Cited

UNITED STATES PATENTS

| 2,315,914 | 4/1943 | Wengel. | |
| 2,443,171 | 6/1948 | Tuttle | 352—146 X |
| 2,691,320 | 10/1954 | Borberg | 352—222 X |
| 3,041,933 | 7/1962 | Emmel. | |
| 3,273,953 | 9/1966 | Davee | 352—222 |

FOREIGN PATENTS

| 576,764 | 4/1946 | Great Britain. |

JULIA E. COINER, Primary Examiner

U.S. Cl. X.R.

88—24